United States Patent [19]

Bue

[11] 4,327,650
[45] May 4, 1982

[54] SUPPORT STRUCTURE FOR MOBILE FOLDING STAGE

[75] Inventor: Richard C. Bue, Chaska, Minn.

[73] Assignee: Sico Incorporated, Minneapolis, Minn.

[21] Appl. No.: 159,234

[22] Filed: Jun. 13, 1980

Related U.S. Application Data

[63] Continuation of Ser. No. 8,613, Feb. 1, 1979, abandoned.

[51] Int. Cl.³ .............................................. A47B 3/00
[52] U.S. Cl. ...................................... 108/113; 108/99
[58] Field of Search ........................... 108/113, 112, 99

[56] References Cited

U.S. PATENT DOCUMENTS

| | | | |
|---|---|---|---|
| 2,764,460 | 9/1956 | Nelson | 108/113 |
| 2,913,294 | 11/1959 | Linde | 108/113 |
| 2,978,754 | 4/1961 | Wilson | 108/112 |
| 3,351,029 | 11/1967 | Bue | 108/112 |
| 4,054,096 | 10/1977 | Wilson et al. | 108/113 |
| 4,067,266 | 1/1978 | Lafargue | 108/113 |
| 4,074,636 | 2/1978 | Wilson | 108/113 |

FOREIGN PATENT DOCUMENTS 687394 2/1953 United Kingdom .

Primary Examiner—Francis K. Zugel
Attorney, Agent, or Firm—Merchant, Gould, Smith, Edell, Welter & Schmidt

[57] ABSTRACT

A mobile folding stage having a pair of stage surface members (10, 11), main support legs interconnected to form a base frame (12), and outer support legs (14, 15). Casters (70–73) are connected to caster beams (60–63) which are pivotally mounted to a caster frame (45) secured to the main support legs. Actuator links (86, 87) connect from the caster beams to the stage surface members to cause extension of the casters when the stage is brought to its horizontal, operable position, and to retract the casters when the stage is folded to its storage position. Outer leg control links (120) are positioned with respect to the outer leg to provide an over center resistance force which holds the stage surface members in their folded position. In the preferred embodiment, elevational adjustment is achieved through auxiliary support legs (130, 131), and the caster beams (60, 61) are shaped and positioned, together with stop members (141, 142) to position and secure the auxiliary legs in their fully extended position.

4 Claims, 10 Drawing Figures

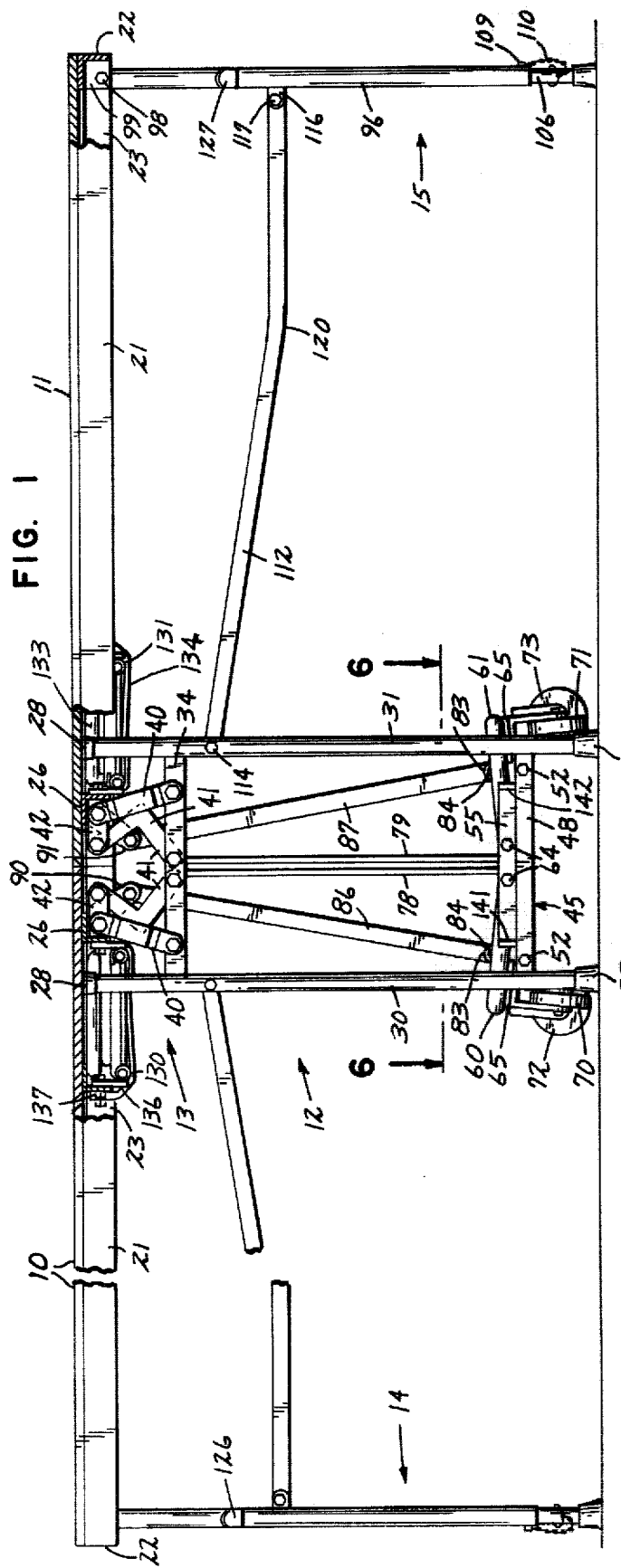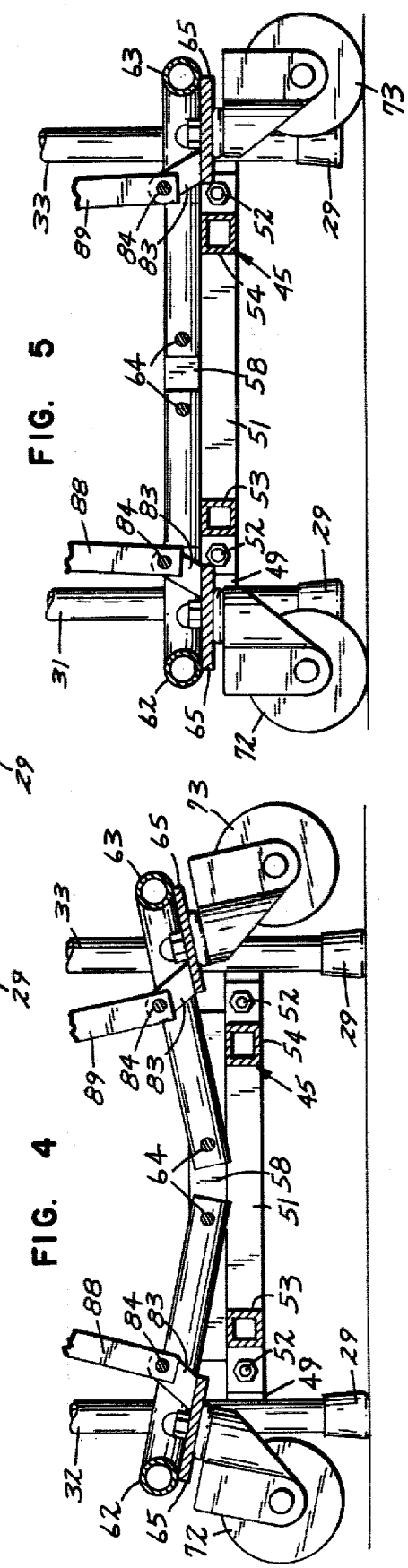

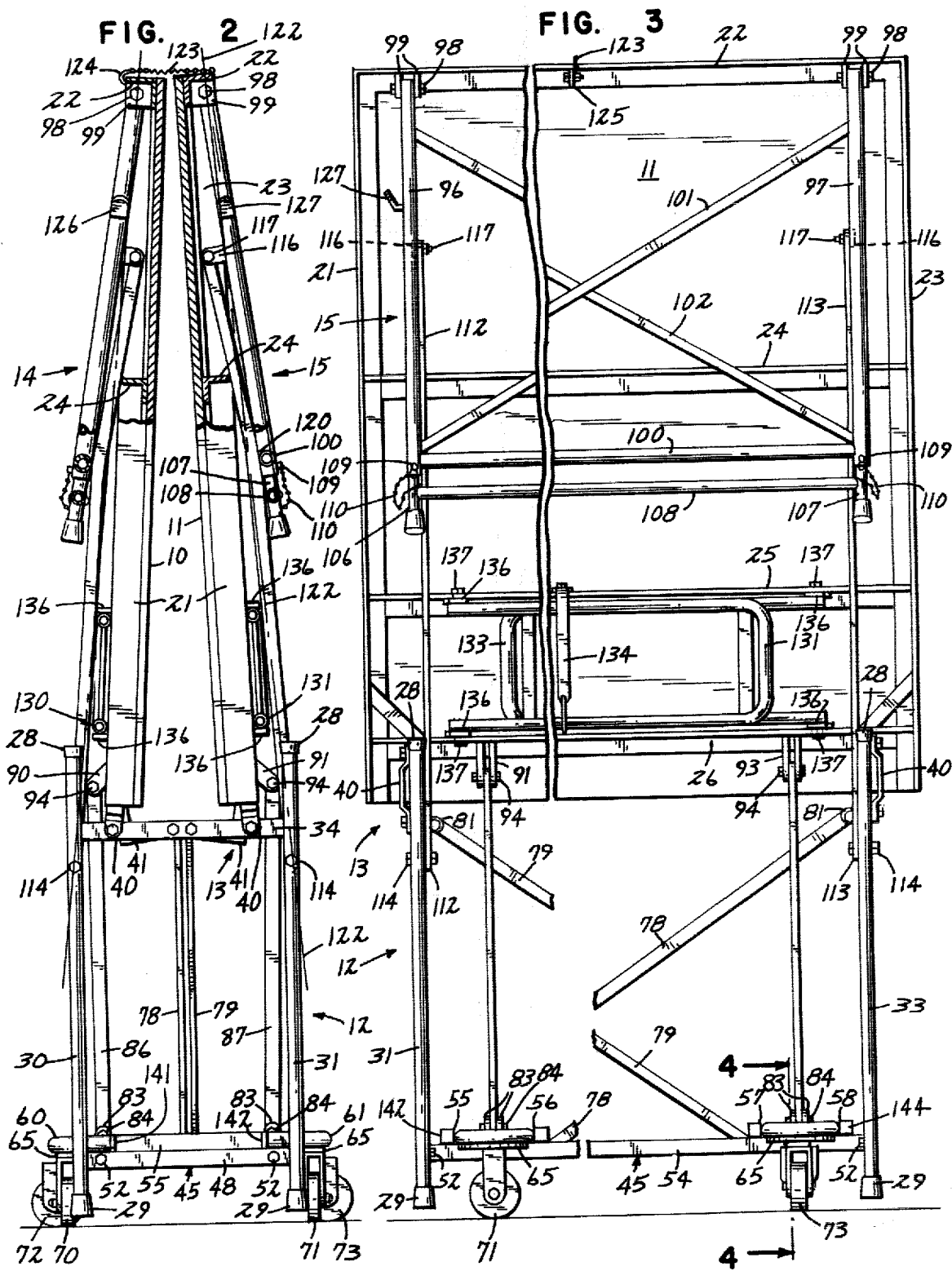

SUPPORT STRUCTURE FOR MOBILE FOLDING STAGE

This application is a continuation of application Ser. No. 8,613, filed Feb. 1, 1979, now abandoned.

TECHNICAL FIELD OF THE INVENTION

The invention pertains to the field of stage structures which in their operable position provide a horizontal stage surface, and which can be folded up to a compact storage position and moved by means of wheels or casters to a storage area when not in use. More particularly, the invention pertains to an improved support structure for a foldable mobile stage.

BACKGROUND OF THE PRIOR ART

Stages consisting of a number of individual foldable, movable stage sections are widely used in multipurpose rooms or areas of hotels, schools, and the like, wherein differing use activities for the rooms require that the stage be capable of rapid setup, takedown and storage. Several different foldable stage structures have been developed for this purpose. One example of a folding mobile stage is found in my prior U.S. Pat. No. 3,351,029, which is assigned to the same assigee as the present invention. Improvements of that prior invention so as to permit elevational adjustment are shown in U.S. Pat. Nos. 3,999,491 and 4,074,636 to Kermit H. Wilson, and assigned to the same assignee as the present invention. In these prior patents, the main support legs generally disposed beneath the center of the stage are interconnected to form a base frame, and hinge means including a plurality of hinge links connect the stage surface members to the base frame to permit them to be folded to a vertical storage position. Caster wheels are provided near the bottoms of the main support legs, connected to sleeves which may move telescopically upward or downward on the legs. Control linkages connect from the stage surface members to the sliding sleeves to cause the casters to retract when the stage is in its operable position, and to be extended beyond the main support legs so as to support the stage, when the stage is in its folded position, so that the stage can be wheeled away to a storage area. While this type of structure has been very successful in achieving its intended function, the present invention makes certain improvements which provide even greater rigidity, better alignment of the stage surfaces, and more convenient and secure folding of the stage in its storage position.

In the prior structure, the rigidity of the base frame formed by the interconnection of the main support legs was limited by the positioning of the sliding sleeves for the casters. Since the sleeves had to move up and down, the lowest cross brace between legs was approximately nine or ten inches from the floor, making the main support legs somewhat vulnerable to bending in case of improper use. Also, the use of sleeves over the leg tubes required a certain amount of looseness of fit so as to make sure there was no problem of movement of the sleeves due to a tight fit between parts. As a result, however, there was a certain amount of looseness in positioning of the legs, and this sometimes required positioning plates on the undersides of the stage surface members for lateral positioning of the tops of the legs to avoid slight lateral misalignment of the stage surface members. The loose fit of the sleeves also resulted in tipping of the sleeves against the legs when the weight of the stage was on the casters, causing a significant and not always predictable amount of friction as the sleeves would move up and down the legs during folding and unfolding. The friction would, of course, make folding and unfolding more difficult. The loose fit and tipping of the sleeves also caused the casters to be slightly off from vertical, increasing the wear on the casters.

SUMMARY OF THE INVENTION

The present invention overcomes these and other problems by providing an improved and more rigid leg and retractable wheel structure. The invention provides a mobile folding stage of the type having a pair of stage surface members and a plurality of main support legs interconnected to form a base frame for supporting the stage in its folded position, and for supporting the inner ends of the stage surface members in the operable position of the stage. Hinge linkages or other hinge means are provided for mounting the stage surface members to the base frame for pivotal movement thereof between a storage position in which the stage surface members are generally vertically positioned above the base frame with the surfaces adjacent each other, and an operable position in which the stage surface members are horizontally positioned with substantially abutting inner edges to define a stage surface. Outer leg means are connected to the stage surface members for supporting the outer ends thereof in the operable position. A plurality of caster beams are provided, having caster wheels, either swivel type or fixed type, mounted thereon. The caster beams are pivotally connected to the lower portion of the base frame to permit pivotal movement thereof so as to alternately bring the caster wheels into, or out of, engagement with the ground or floor. Actuation links connect the caster beams to the stage surface members so as to pivot the beams to retract the casters when the stage is in its operable position, so that the stage is supported by the main support legs, and for pivoting the caster beams to extend the casters into ground or floor engagement when the stage surface members are folded to the storage position so that the stage is supported by the caster wheels, permitting easy movement thereof.

The invention eliminates the looseness of fit associated with the sliding sleeves, and solves the friction, rigidity, stage alignment and caster positioning problems associated therewith. The invention also permits lower, as well as more rigid, interconnection between the main support legs to protect the lower portions thereof.

When used in an elevationally adjustable stage using auxiliary fold-down support legs generally of the type shown in U.S. Pat. Nos. 3,999,491 and 4,074,636, the present invention provides the further advantage of positive positioning and location of the auxiliary legs, for further improving rigidity and alignment. For this purpose, in the preferred embodiment the caster beams have a curved outer portion which engages the auxiliary support legs as the stage is unfolded, and guides them to their fully unfolded position adjacent the caster beam. An abutment bracket is also provided for longitudinal positioning of the auxiliary legs with respect to the base frame, to ensure precise vertical alignment of the adjacent inner edges of the stage surface members.

According to another feature of the present invention, the outer support legs and the control links therefor are designed for over center positioning when the stage is in its storage position, to serve as a lock holding the stage surface members in their vertical storage position.

BRIEF DESCRIPTION OF THE DRAWINGS

In the drawing,

FIG. 1 is a side elevational view showing a stage according to the present invention in operable position, portions thereof broken away and shown in section;

FIG. 2 is a side elevational view of the stage of FIG. 1 shown in its storage position, portions thereof broken away and shown in section;

FIG. 3 is a side elevational view of FIG. 2, as seen from right to left, portions thereof broken away;

FIG. 4 is an enlarged vertical section seen generally from the line 4—4 of FIG. 3;

FIG. 5 is a view similar to FIG. 4, but showing the caster wheels in their extended position;

DETAILED DESCRIPTION OF THE PREFERRED EMBODIMENT

Figure 6:
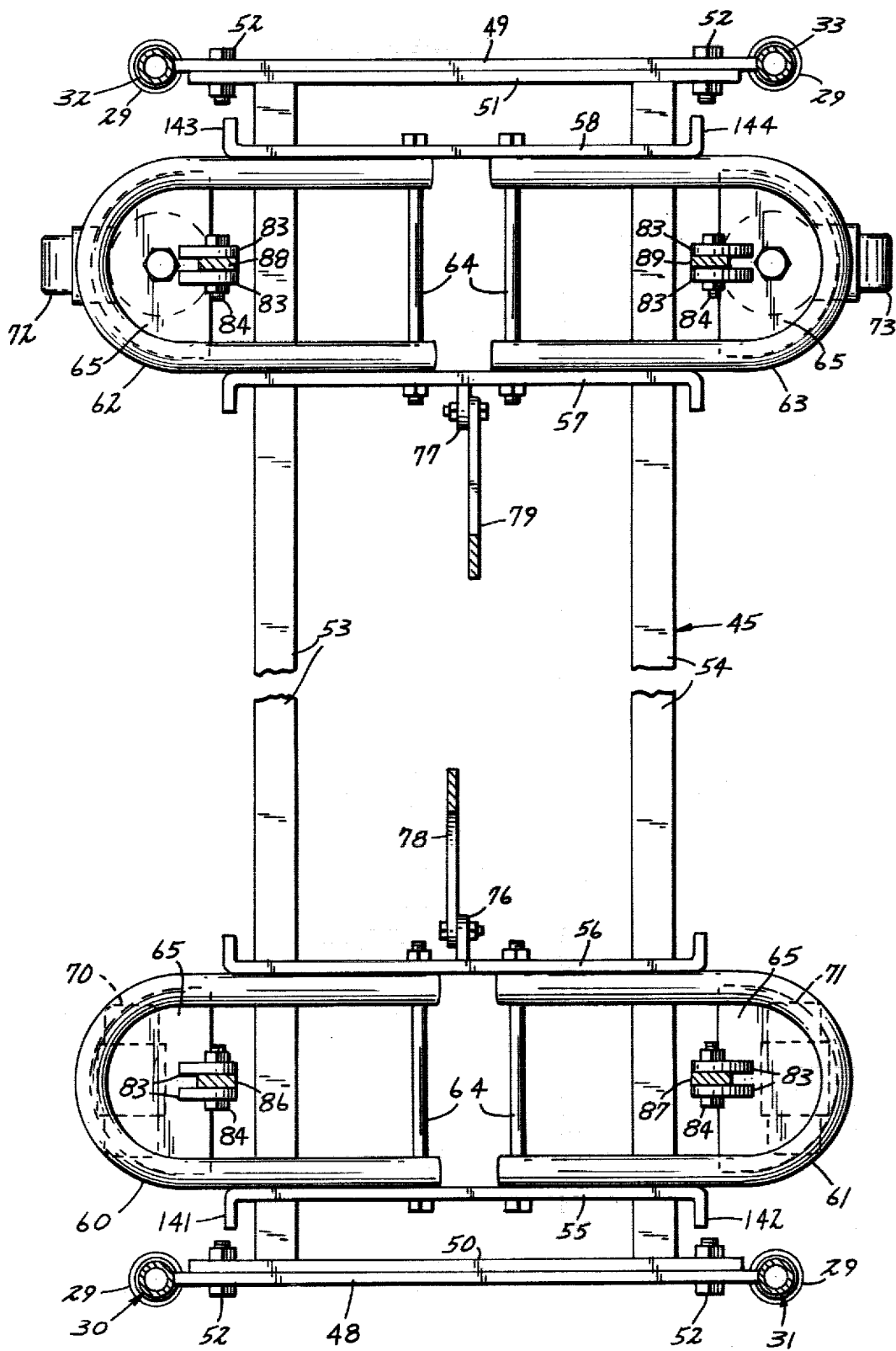
FIG. 6 is an enlarged horizontal section as seen generally from the line 6—6 of FIG. 1, portions thereof broken away.

The overall configuration of the mobile folding stage incorporating the present invention is shown in FIGS. 1, 2 and 3. The stage surface members are indicated by reference numbers 10 and 11. Reference number 12 generally indicates the base frame, which is composed of main support legs and interconnecting members, as explained hereinafter. Reference number 13 generally designates the hinge means which connects stage surface members 10 and 11 to base frame 12. Reference numbers 14 and 15 designate the outer leg means for stage surface members 10 and 11, respectively.

The stage surface members are flat and rectangular in shape, and may be made from any suitable material such as steel, plywood, particle board and the like, and the members may have a decorative or protective covering layer (not shown) as is generally known. As seen in FIG. 3 with respect to stage surface member 11, a reinforcing frame is made from a plurality of welded or bolted angle iron rails. Reinforcing rails 21 and 23 are placed along the sides, and reinforcing rail 22 is located along the end. A plurality of cross-reinforcing rails 24, 25 and 26, also made from angle iron, extend between side rails 21 and 23, and connect thereto. The stage surface member 11 may be secured by any suitable means to the support frame, as is generally known in the art. The support frame, in addition to providing additional strength for the stage, provides convenient points for connection of hardware and components. A similar supporting frame is provided for stage surface member 10.

Base frame 12 includes four main support legs 30–33, as shown in the various drawings. Legs 30 and 32 are positioned on either side of stage surface member 10, generally beneath and adjacent the inner end thereof which abuts the inner end of stage surface member 11 in the operable position of FIG. 1. Similarly, main support legs 31 and 33 are provided beneath stage surface member 11. The main support legs are preferably tubular steel members of sufficient size for the loads to be encountered on the stage. Caps or glides 28 are provided on the tops of the main support legs so the sharp edges thereof will not cut into the underside of the stage surface members as they rest on the tops of the main support legs in the operable position. An upper cross member 34 connects between legs 30 and 31 near the upper ends thereof, as part of the base frame. Cross member 34 is preferably made from a piece of steel bar stock, and it is secured to the legs by welding. A similar cross member not shown in the Figures interconnects the upper portions of legs 32 and 33 on the other side of the stage.

While a number of different hinge configurations could be used, the preferred embodiment uses the multiple link hinge from prior U.S. Pat. No. 3,351,029. Link 40 and elbow link 41 are pivotally connected at their lower ends to cross member 34, and at their upper ends to a bracket 42 which is bolted to cross-reinforcing rail 26 beneath stage surface member 11. A similar pair of links are provided at the other side of stage surface member 11, and similar pairs are provided for either side of the inner end of stage surface member 10. As shown in my above-mentioned prior patent, these links are designed to permit pivotal movement of the stage surface members between the operable position shown in FIG. 1, and the storage position shown in FIG. 2. In the operable position, the inner edges of stage surface members 10 and 11 are in direct abutment without a significant gap or obstruction.

The lower ends of the main support legs have glides or feet 29 as is generally known to prevent marking the floor while providing adequate slide resistance for the stage.

The lower ends of the main support legs are interconnected by the caster frame, generally indicated by reference numeral 45. This frame is placed relatively low on the legs, as determined by the height of the casters, so as to provide increased rigidity to the base frame. As best seen in FIG. 6, the caster frame includes a lower cross member 48 extending between legs 30 and 31, and formed from a piece of bar stock welded to the main support legs. A similar lower cross member 49 extends between main support legs 32 and 33.

A pair of mounting bars 50 and 51 are bolted respectively to lower cross members 48 and 49, by a plurality of bolt and nut assemblies 52. Lateral members 53 and 54 are welded to mounting bars 50 and 51, and extend from one side of the stage to the other. Lateral members 53 and 54 are preferably made of square sectioned steel tubes, as seen in sectional view in FIGS. 4 and 5. Beam carriers 55–58 are made of bar stock, and are welded to lateral members 53 and 54, as seen in FIG. 6. The casters are attached to caster beams, indicated by reference numbers 60–63, which are pivotally connected to the beam carriers. In the preferred embodiment, the caster beams are formed from steel tubes, bent into a U-shape. The open ends of the caster beams are pivotally connected by means of pivot bolts 64 to the beam carriers. Specifically, caster beams 60 and 61 are positioned between, and pivotally connected to, beam carriers 55 and 56, while caster beams 62 and 63 are similarly connected to beam carriers 57 and 58. The rounded closed end portion of the U-shaped caster beams project outwardly beyond lateral members 53 and 54. Semicircular plates 65 are welded beneath the curved ends of the caster beams, and the casters are connected thereto. In the preferred embodiment, fixed casters 70 and 71 are secured to the plates 65 in caster beams 60 and 61, respectively, while swivel casters 72 and 73 are connected to caster beams 62 and 63. This is to allow the stage to be guided more easily as it is being moved in its storage position. Of course, all four casters could be swivel casters if desired.

A pair of pad eyes 76, 77 are welded to beam carriers 56 and 57, respectively, on the inward sides thereof. A pair of cross braces 78 and 79 are bolted thereto. The other end of cross brace 79 is bolted to a pad eye 81 welded on the back side of upper cross member 34. The other end of cross brace 78 is bolted to a similar pad eye 81 welded to the back side of the corresponding upper cross member (not shown) that extends between main support legs 32 and 33. These cross braces serve to further increase the rigidity of the base frame for the stage.

A pair of pad eyes indicated by reference numeral 83 are welded in spaced apart position to the top surface of each of the plates 65 for each of the caster beams. Actuation links 86–89 extend downwardly from the stage surface members and their ends are pivotally connected to these pad eyes. Specifically, the end of actuation link 86 is pivotally connected to pad eyes 83 for caster beam 60, by means of a pivot bolt 84. In similar manner, the end of actuation link 87 connects to the pad eyes for caster beam 61, and actuation links 88 and 89 are pivotally connected to the pad eyes for caster beams 62 and 63, respectively. The upper ends of actuation links 86–89 are pivotally connected to brackets positioned beneath the stage surface members near the inner ends thereof. For example, as seen in FIG. 3, actuation link 87 is pivotally connected to bracket 91, which comprises a pair of pad eyes welded to cross-reinforcing rail 26 for stage surface member 11. The link is connected by means of a pivot bolt assembly 94. As can be seen in FIGS. 2 and 4, bracket 91 extends downwardly from the stage surface member and generally in a direction towards the inner end of the stage surface member. Actuation link 89 is similarly pivotally connected to bracket 93. Stage surface member 10 has similar brackets, and bracket 90 which pivotally connects actuation link 86 is shown in FIGS. 1 and 2. A similar bracket is provided for connecting the upper end of actuation link 88, but is not visible in the drawings.

Operation of the means for retracting the casters is seen with reference to FIGS. 1, 2, 4 and 5. FIGS. 1 and 4 show the positioning of the casters and caster beam when the stage is in its horizontally extended operable position. The positioning of the actuation link brackets, and the length of the actuation links are designed to lift the caster wheels off the ground by pivoting the caster beams upward, as shown in FIG. 4, when the stage is in its horizontally extended operable position as shown in FIG. 1. As the stage surface members are swung upwardly to the storage position indicated in FIG. 2, the actuation links move downwardly, bringing the caster wheels into ground or floor engagement, and lifting the main support legs off the floor, as indicated in FIGS. 2 and 5. In this position, the stage may be wheeled to the storage area. It is apparent that the brackets 90 and 91 for the actuation links, and the corresponding brackets on the other side of the stage, are positioned generally inwardly of the effective pivot axis of the respective stage surface members, so that the required downward motion will be transmitted to the actuation links for the caster beams, as the outer ends of the stage surface members are moved upwardly. Of course, it is also possible to provide the necessary retraction and extension motion for the caster beams by other equivalent linkages appropriately connected to other portions of the stage surface members or the hinge means.

The configuration and operation of outer leg means 15 will now be explained with the aid of FIGS. 1, 2 and 3, it being understood that the construction and operation of outer leg means 14 for the other stage half is substantially identical.

The preferred embodiment of the stage is adapted for vertical height adjustment, and outer leg means 14 and 15 therefore have telescoping lower portions in the Figures and the following description. However, the invention is not limited to elevationally adjustable stages.

As seen in FIG. 3, outer leg means 15 comprises a pair of tubular leg members 96 and 97, positioned beneath and along either side of stage surface member 11. Leg members 96 and 97 are pivotally connected to the stage surface member at their upper end, by means of pivot pins 98, which pass through pairs of pad eyes 99 welded to reinforcing angle iron rail 22. Leg members 96 and 97 are interconnected for added rigidity by a tubular cross brace member 100 welded between them near their lower ends, and a pair of cross braces 101 and 102 which are also welded. Leg member 96 has a lower portion 106 which telescopically fits inside the leg, and leg member 97 has a corresponding telescopic lower portion 107. These two lower leg portions are connected together by a tubular cross brace 108.

Elevational adjustment of the outer leg means is accomplished by means of pins 109 which pass through holes in the tubular leg members 96, 97, and corresponding holes in telescopic lower portions 106 and 107. Additional pairs of holes are provided at different spacings so that the overall effective length of outer leg means 15 can be adjusted in height by removing the pins, extending the telescopic lower portion, and reinserting the pins in the proper holes. Retaining chains 110 are provided to prevent loss of the pins while changing heights.

Folding and unfolding of the outer leg means is accomplished by a pair of outer leg control links 112 and 113. As seen in FIG. 1, link 112 pivotally connects to main support leg 31 by pivot pin 114, and to a pad eye 116 welded to tubular leg member 96, by means of a further pivot pin 117. Similar pivotal connections are provided for the remaining three outer leg control links. As can be seen in FIG. 1 with reference to link 112, the outer leg control links have bends or elbows, as indicated by reference numeral 120.

In operation, as the stage surface member is swung upwardly, the outer leg control links serve to pivot the outer support leg inwardly with respect to the stage surface member, so that when a stage is completely folded, the outer support legs are essentially folded along the undersides of the stage surface member as shown in FIG. 2. Generally speaking, this type of folding action for the outer leg is well known, as exemplified by the above-mentioned prior art patents. However, the present invention provides a further improvement to provide an over center locking force to help keep the stage in its storage position. Specifically, pad eye 116 provides an offset of the pivot point for pin 117 from the plane of tubular leg member 96. This offset, in conjunction with the bend 120 in the outer leg control link allows pivot pin 117 to pass through a plane containing pivot pins 98 and 114 as the stage is being folded. As this occurs, a slight resistance force takes place, resulting in a lateral resilient bending of link 112. FIG. 2 shows that in the storage position, pivot pin 117 has passed through the plane containing pivot points 114 and 98. This latter plane is indicated in FIG. 2 by a line and reference numeral 122. To unfold the stage, it is necessary to pull outwardly on the folded outer leg with sufficient force to return the pivot points just described through the center position, after which the stage will tend to move freely to its horizontal position. Because of the over center force, the stage halves will be normally held in their storage position, and a definite pull will be required to bring them out of the over center condition. For added security, a spring catch is provided. Spring 123 connects through a chain to a bracket 125 welded to member 22, and the spring has a hook 124 on its other end for hooking around the corresponding angle iron member on the other stage surface member. The hook must be manually released before the stage can be unfolded.

Tabs 126 and 127 are provided as is generally known in the art, for purposes of hooking the edge of an adjacent stage section set at a lower height to create a stepped or riser type of stage.

It will be appreciated that the improved base frame and retracting caster arrangement previously described, and the over center locking arrangement for the outer support leg described above, are independent of whether they are used on the stage having a fixed height or a variable height stage. In case of a fixed height, of course, the telescoping lower portions of the outer support legs would not be required.

Figure 7:
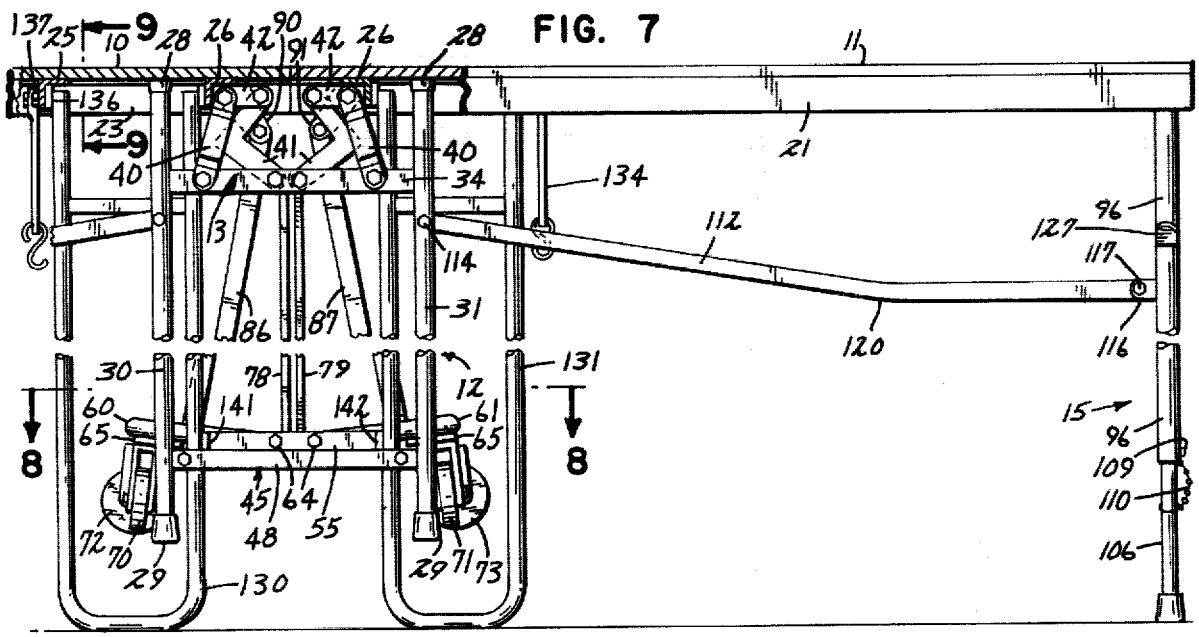
FIG. 7 is a view generally similar to FIG. 1, but showing the auxiliary support legs extended for elevation of the stage to its higher position.
Figure 9:
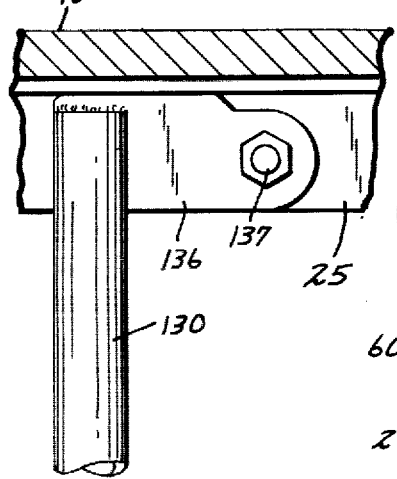
FIG. 9 is a fragmentary detail sectional view as seen generally from line 9—9 of FIG. 7, on an enlarged scale.

For use with a vertically adjustable stage, fold-down auxiliary support legs are provided, as covered in the above-mentioned U.S. Pat. Nos. 3,999,491 and 4,074,636. A pair of auxiliary legs is provided for each stage surface member. In FIG. 3, auxiliary legs 131 and 133 are shown in their folded position against the bottom side of the stage surface member, where they may be held in place by a rubber strap and hook 134. A similar pair of auxiliary legs are provided for stage surface member 10, and auxiliary leg 130 is shown in FIG. 7 in its extended position. The auxiliary legs are made of tubular members bent into a generally U shape, with the upper portion pivotally connected to the stage surface members as will be described, and with the lower portions flattened for ground or floor engagement when the stage is in its elevated position as shown in FIG. 7. FIG. 9 shows in enlarged fragmentary form, the upper portion of auxiliary leg 130 welded to an offset tab 136, which in turn is pivoted to the cross-reinforcing angle iron beneath the stage surface member by means of a pivot bolt 137. Similar offset tabs and pivots are provided for both uprights of each of the four auxiliary legs, and they permit the legs to be laterally folded to the storage position as shown in FIG. 3, or extended as shown in FIG. 7. In the extended position the sides of offset tabs 136 engage the flanges of the reinforcing angle irons to thus transfer the weight of the stage to the auxiliary legs.

Although the use of auxiliary legs of this type for height adjustment is disclosed in U.S. Pat. Nos. 3,999,491 and 4,074,636, their use in conjunction with the improved base frame and caster structure of the present invention results in further improved operation.

Figure 8:
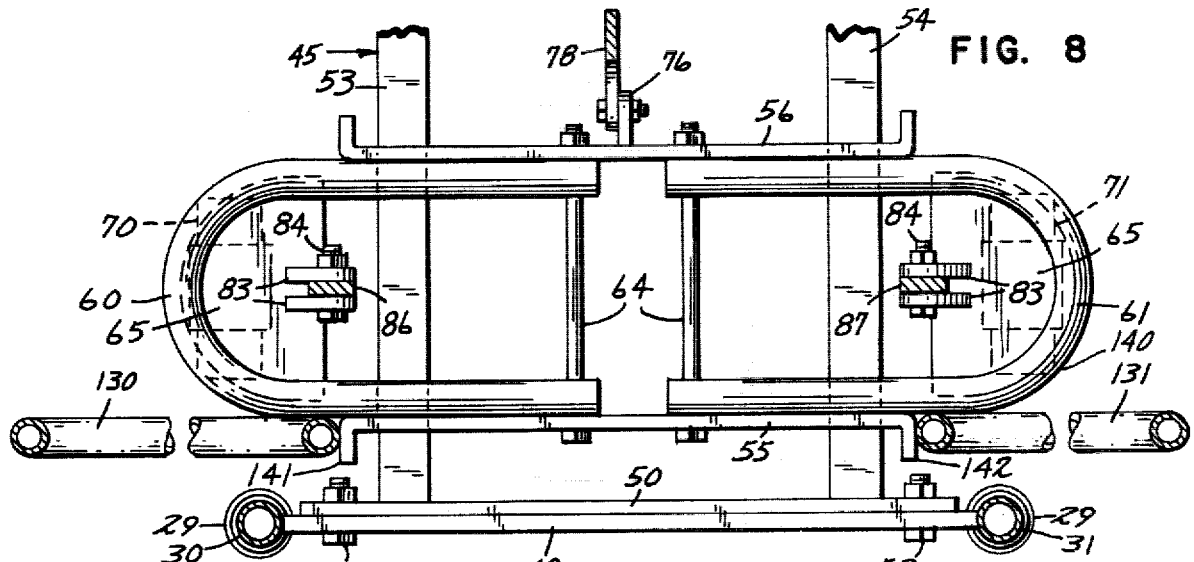
FIG. 8 is an enlarged fragmentary horizontal sectional view as seen generally from line 8—8 of FIG. 7.

In the prior patents, a plurality of locating tabs are provided on the auxiliary legs to hold them in their vertical position in use. These tabs have been eliminated in the present invention by the use of properly designed caster beams. This is shown in FIG. 8, which is generally similar to one end of FIG. 6, except that it shows auxiliary legs 130 and 131 in their down position as in FIG. 7. The width and positioning of caster beams are designed so that side portions of the caster beams abut the auxiliary legs to hold them in their fully extended vertical position. As seen in FIG. 8, auxiliary leg 130 is positioned against the side of caster beam 60, and this prevents the leg from trying to fold up. At the same time, the leg cannot move further outward, i.e., in a direction away from caster beam 60, because of the engagement of the offset tabs 136 to the stage surface member reinforcing angle irons as described above with respect to FIG. 9. The auxiliary support legs are therefore secured in their full vertical position, adding yet another degree of rigidity to the structure.

As taught in the above-mentioned patent, the auxiliary legs are brought into use position while the stage is still in its folded position. The auxiliary legs are first laterally folded to extend outwardly from the bottom side of the stage surface member, and the surface member is then lowered towards its horizontal position. Because the auxiliary legs are longer than the base frame of the stage, they engage the floor before the outer ends of the stage surface members are fully horizontal. As the outer end is brought fully horizontal, the stage is forced to pivot about the floor-engaging portion of the auxiliary support leg, which lifts the main support legs and the entire base frame off the ground to the position shown in FIG. 7.

If it should happen that an auxiliary support leg is not quite fully extended before the stage surface is brought downward, the rounded shoulder of the caster beam in the preferred embodiment will help guide it in the proper place. Thus, for example, in FIG. 8, if auxiliary leg 131 was not quite fully extended, it would engage caster beam 61, for example, at shoulder portion 140. Due to the rounded shape of the caster beam, as the stage surface member 11 is brought more toward the horizontal, the curved edge of the caster beam would guide and fully extend the auxiliary leg to the position shown in FIG. 8. Of course, if the leg is initially too far out of position, this effect will not work, but that degree of misalignment should be apparent to the operator as he attempts to set up the stage. At any rate, the effect described above does provide a self-centering action for final alignment of the auxiliary legs. The same effect can be obtained by using other shapes for the caster beam. For example, a V-shaped or other member having an angled shoulder portion would also serve to center the auxiliary leg.

A further improvement involves the use of tabs 141–144 formed in the ends of beam carriers 55 and 58. As seen best in FIG. 8, tabs 141 and 142 are abutted by auxiliary legs 130 and 131. The same situation is true with respect to tabs 143 and 144 for the other side of the stage, as shown in FIG. 6. These tabs serve to provide rigidity between the auxiliary legs on the opposite stage halves, and they prevent an unwanted slight rocking or pivoting of the base frame structure which could otherwise occur and which would result in slight vertical misalignment of the adjacent inner edges of the stage surface members 10 and 11. For convenience of manufacture, beam carriers 56 and 57 also have tabs so that the same part can be used in any of the four positions, but the tabs for the inboard beam carriers are not used.

Figure 10:
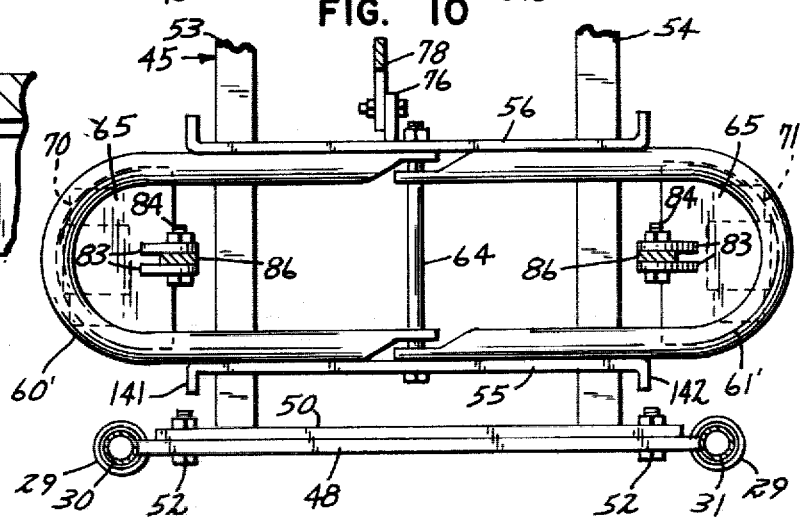
FIG. 10 is a view similar to FIG. 8, but showing an alternate embodiment thereof.

An alternate embodiment is shown in FIG. 10, wherein there is a single pivot bolt 64 pivotally connecting the ends of both caster beams to the beam carriers 55 and 56. The ends of the caster beams are slightly different in this embodiment, and for this reason the beams have been indicated by reference numerals 60' and 61'. Basically, the tubular section of the caster beams is flattened at their ends so that the two opposite beams can be positioned together for the same pivot bolt. This embodiment has the advantage of requiring only a single pivot bolt, but has the disadvantage of requiring additional steps in flattening the ends.

As set forth in the foregoing description, the present invention provides an improved folding stage having greater rigidity in its base frame, smoother operation in the retraction and extension of the casters, an over center resistance force in the outer support legs for holding the stage surface members in their storage position, and a self-centering and aligning feature for positioning the auxiliary leg when the stage is in its elevated position.

I claim:

1. A mobile folding stage comprising:

a pair of stage surface members;

a plurality of main support legs and means interconnecting said legs to form a base frame for supporting the stage;

means for hingably mounting said pair of stage surface members to said base frame for pivotable movement of said members between an operable position in which the stage surface members are horizontally positioned with substantially abutting inner edges over the base frame to define a stage surface, and a storage position in which said members are generally vertically positioned above the base frame with surfaces adjacent each other;

outer leg means connected to said stage surface members for supporting the outer ends thereof in said operable position;

said base frame including a caster frame interconnecting the lower portions of said main support legs;

a plurality of caster beams pivotally connected to said caster frame;

a plurality of caster wheels mounted to said caster beams spaced from the pivotal connections thereof, for movement into and away from ground or floor engagement upon pivotal movement of the caster beams;

actuation links connected to said caster beams and to said stage surface members for pivoting said caster beams to retract said casters when the stage is in its operable position so that the stage is supported by said main support legs, and for pivoting said caster beams to extend said casters into ground or floor engagement when said stage surface members are folded to said storage position so that the stage is supported by the caster wheels to permit movement of the stage;

auxiliary support legs longer than said main support legs pivotally connected to the undersides of said stage surface members near the inner ends thereof for lateral movement between folded storage and unfolded use positions for elevational adjustment of stage height;

said caster beams positioned for lateral abutment with said auxiliary support legs to hold them in their unfolded use position; and abutment members attached to said base frame adjacent said caster beams for longitudinal abutment with said auxiliary support legs in their unfolded use position so that the base frame and inner edges of the stage surface members are held in alignment against rocking motions by abutment with the auxiliary support legs on opposite sides of the base frame.

2. A mobile folding stage comprising:

a pair of stage surface members;

a plurality of main support legs and means interconnecting said legs to form a base frame for supporting the stage;

means for hingably mounting said pair of stage surface members to said base frame for pivotal movement of said members between a storage position in which said members are generally vertically positioned above the base frame with the surfaces adjacent each other, and an operable position in which the stage surface members are horizontally positioned with substantially abutting inner edges to define a stage surface;

outer leg means connected to said stage surface members for supporting the outer ends thereof in said operable position;

auxiliary support legs longer than said main support legs pivotally connected to the undersides of said stage surface members near the inner ends thereof for lateral movement between folded storage and unfolded use positions for elevational adjustment of stage height, and wherein caster beams are positioned for lateral abutment with said auxiliary support legs to hold them in their unfolded use position;

a plurality of said caster beams including caster wheels mounted thereon and having curved or angled end portions extending outwardly from the pivotally connected portions thereof, for engaging the auxiliary legs if partially unfolded and causing them to fully unfold to their use position as the stage surface members are pivoted to their operable position;

means pivotally connecting said caster beams to the lower portion of said base frame for pivotal movement thereof to alternately bring said caster wheels into or out of engagement with the ground or floor; and actuation links connected to said caster beams and to said stage surface members for pivoting said caster beams to retract said casters when said stage is in its operable position so that the stage is supported by said main support legs, and for pivoting said caster beams to extend said casters into ground or floor engagement when said stage surface members are pivoted to said storage position so that the stage is supported by the caster wheels to permit movement of the stage.

3. A mobile folding stage comprising:

a pair of stage surface members;

a plurality of main support legs and means interconnecting said legs to form a base frame for supporting the stage;

means for hingably mounting said pair of stage surface members to said base frame for pivotable movement of said members between an operable position in which the stage surface members are horizontally positioned with substantially abutting inner edges over the base frame to define a stage surface, and a storage position in which said members are generally vertically positioned above the base frame with surfaces adjacent each other;

outer leg means connected to said stage surface members for supporting the outer ends thereof in said operable position;

said base frame including a caster frame interconnecting the lower portions of said main support legs;

auxiliary support legs longer than said main support legs pivotally connected to the undersides of said stage surface members near the inner ends thereof for lateral movement between folded storage and unfolded use positions for elevational adjustment of stage height, and wherein caster beams are positioned for lateral abutment with said auxiliary support legs to hold them in their unfolded use position;

a plurality of caster beams pivotally connected to said caster frame having curved or angled end portions extending outwardly from the pivotally connected portions thereof, for engaging the auxiliary legs if partially unfolded and causing them to fully unfold to their use position as the stage surface members are pivoted to their operable position;

a plurality of caster wheels mounted to said caster beams spaced from the pivotal connections thereof, for movement into and away from ground or floor engagement upon pivotal movement of the caster beams; and actuation links connected to said caster beams and to said stage surface members for pivoting said caster beams to retract said casters when the stage is in its operable position so that the stage is supported by said main support legs, and for pivoting said caster beams to extend said casters into ground or floor engagement when said stage surface members are folded to said storage position so that the stage is supported by the caster wheels to permit movement of the stage.

4. A mobile folding stage comprising:

a pair of generally planar stage surface members;

two pairs of rectangularly spaced main support legs and means interconnecting pairs of said legs to form a base frame for said stage;

means for hingably mounting said pair of stage surface members to said base frame for pivotal movement of said members between an operable position in which the stage surface members are horizontally positioned with substantially abutting inner edges centered over said rectangular base frame to define a stage surface, and a storage position in which said stage surface members are generally vertically positioned above said base frame;

outer legs connected to said stage surface members for supporting the outer ends thereof in said operable position;

auxiliary support legs for elevational adjustment of the stage height, said auxiliary support legs being longer than said main support legs and being pivotally mounted to the undersides of said stage surface members near the inner ends thereof for lateral movement between folded storage positions and unfolded use positions;

said base frame including a caster frame interconnecting said main support legs near the lower portions thereof;

four caster beams each having a caster wheel mounted adjacent one end thereof;

means pivotally connecting said caster beams adjacent their other ends to said caster frame adjacent said main support legs;

actuation links pivotally connected to said caster beams and to the underside of said stage surface members near the inner ends thereof for pivoting said caster beams to retract the casters when the stage is in its operable position so that the stage is supported by said main support legs, and for pivoting said caster beams to extend said caster wheels into ground or floor engagement when said stage surface members are pivoted to said storage position so that the stage is supported by the caster wheels to permit movement of the stage;

wherein said caster beams are positioned on said caster frame for lateral abutment with said auxiliary support legs to secure them in their unfolded use position and wherein said caster beams are U-shaped members with their open ends pivotally connected to said caster frame and said casters mounted to their closed ends, the caster beams being positioned for lateral abutment of said auxiliary support legs against a side portion of said caster beam when the auxiliary support legs are in their unfolded use position, and for engagement of said caster beams if said auxiliary support legs are not fully unfolded when the stage surface members are pivoted to their horizontal position, whereby said shoulder portions will move said auxiliary support legs to their fully unfolded positions.

* * * * *